June 15, 1954  A. L. MATHISEN  2,680,944
FLEXIBLE LAND CLEARING HARROW
Filed Jan. 24, 1949
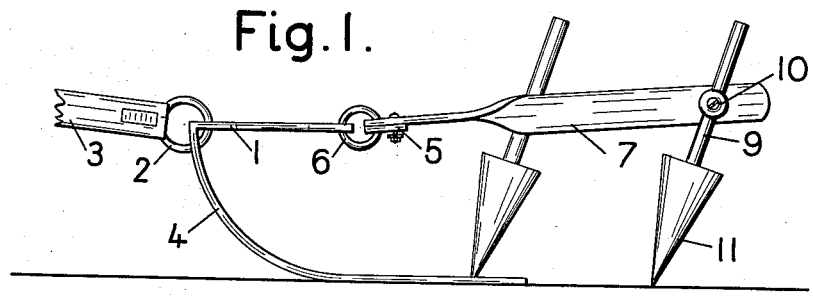
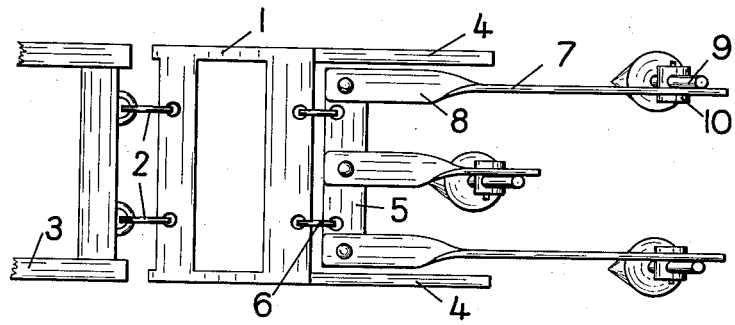
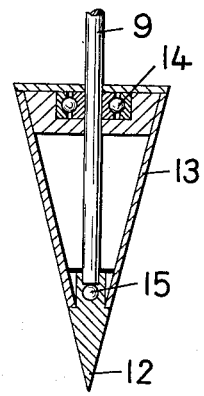
INVENTOR
Arne L. Mathisen
By Watson, Cole, Grindle & Watson Patented June 15, 1954

2,680,944

UNITED STATES PATENT OFFICE 2,680,944

FLEXIBLE LAND CLEARING HARROW

Arne Lars Mathisen, Oslo, Norway

Application January 24, 1949, Serial No. 72,493

Claims priority, application Norway January 23, 1948

5 Claims. (Cl. 55—3)

The present invention relates to agricultural implements especially adapted for the cultivation or tillage of woodland or field ground by means of tines or the like and the object of the invention is to provide an implement which is simple in construction and the functioning of which is not substantially hindered by stones, roots or like obstructions encountered during the work.

According to the invention this object is achieved by providing each of the tines of the implement with a pointed member which is freely rotatable about the length axis of the tine. When moved along the ground, the said pointed members penetrate into the ground, but when abutting against a stone or root or the like, the fact that each pointed member is freely rotatable will make the tine perform a rolling movement on the obstructional body to the effect that the tine and the said body are effecting a transverse pushing force against each other and thereby easily passing each other without undue breaking stresses on the tine and without any delay in the work. In order to facilitate this relative sliding or rolling movement, the pointed members conveniently are made in the form of downwardly directed cones, whereby the additional effect is obtained that twigs and the like are held against the ground and further that the pointed members are subjected to a lifting force when abutting against obstructions. It may also be found convenient to provide the pointed members with longitudinal edges or the like which will also assist in effecting the rolling movement described above.

The tines suitably are mounted on separate supporting bars extending essentially in the direction of movement of the implement as a whole, the said bars being connected at their forward end to a transverse draw bar which may be common to a plurality of tine supporting bars, the number of tines and their spacing thereby being variable according to requirements and conditions of the field to be cultivated. When intended for cultivating stony fields or woodlands with many roots, the implement may be formed with pivot connections between the individual tine supporting bars and the common transverse draw bar, whereby each tine with its associated supporting bar may perform a swinging movement when rolling along a stone or root obstructing the linear forward movement of the tine.

In an implement comprising a plurality of tines it may also be desirable to make the individual tine supporting bars slightly resilient in vertical direction or, alternatively, adapted to pivot in the vertical direction above the point of connection to the transverse draw bar, so as to enable the tines to be lifted individually when abutting against an obstruction, without affecting the other tines in any way.

The transverse draw bar may be connected to a horse's shaft or a tractor through a sleigh-like limber, thereby introducing a considerable elasticity in vertical direction in the relative heighs of the tines and the traction organ. The sleigh runners conveniently may extend backwardly beyond the transverse draw bar so as to make the latter occupy a substantially constant height above the ground. This arrangement also enables the placing of the draw bar with associated tine supporting bars and tines on the sleigh limber during transport. To facilitate transport and also decrease, the traction force required during working, the sleigh runners may also be provided with wheels, which may be detachable or foldable, it being also possible to mount special shoes of greater width on the runners when working on soft ground where the ordinary runners are apt to cut into the ground.

The accompanying drawing illustrates an embodiment of the implement according to the invention, Figure 1 being a side view of the implement, Figure 2 a plan view and Figure 3 a sectional view along the axis of a pointed member of a tine.

In the drawing, I is the limber which through transversely and vertically yielding connections 2 is connected to the traction organ, which in the present case is illustrated as a horse's shaft 3. The limber I is provided with sleigh runners 4 and is rearwardly connected to a transverse draw bar 5 by means of transversely and vertically yielding connections 6. In the embodiment shown, the draw bar 5 carries three longitudinal rearwardly extending bars 7 which are attached to the bar 5 in any suitable manner so as to enable the same to perform swinging movements in the horizontal plane and also a limited swinging movement in the vertical plane relatively to the bar 5. The bars 7 suitably are made of flat irons thereby imparting a certain flexibility to the foremost portion 8 of the bars, whereupon the flat irons are twisted on edge to be adapted to support the tines 9. The connection between each of the said bars 7 and each of the tines 9 is effected by means of any convenient means, generally referred to by 10, so that the height of each tine 9 and the angle of the same relatively to the direction of length of the bar 7 may be adjusted individually at any desired values. The tines 9 are provided with pointed members 11, which are shown at a larger scale in Figure 3. This member comprises the point proper 12 which is made of any suitable wear resistant material and a casing 13 of suitable shape and material, for instance trunconical as shown in Figure 3. The pointed member 11 is borne on the tine shaft 9 by means of an antifriction bearing 14 arranged in the top of the casing 13 and a ball 15 or the like situated at the bottom end of the shaft 9 supporting the axial forces, so that the pointed member may turn on the shaft 9 without any essential friction.

The point member 9 shown in the drawing is only to be considered as an example, it being possible to make the same with any apex angle according to the soil to be cultivated. Further the casing 13 may be formed in any suitable manner, for instance corrugated or with oblique or vertical edges to improve the grip on and treatment of roots or the like against which the pointed member may abut.

I claim:

1. An agricultural implement especially adapted for the cultivating of woodland and field ground, comprising a transverse draw bar, a plurality of supporting means separately connected to said draw bar for horizontal and limited vertical swinging movements relative thereto, and at least one ground-engaging tine secured to each said supporting means in generally vertical position, each said tine comprising a generally vertically disposed shaft and a pointed member mounted for free rotation about the lower end of said shaft.

2. An agricultural implement according to claim 1, said pointed member being conical.

3. An agricultural implement according to claim 1, each said supporting means supporting a single tine.

4. An agricultural implement according to claim 1, each said supporting means having a vertically resilient portion between said draw bar and said tine.

5. An agricultural implement according to claim 1, including means fixed on each said supporting means for vertically adjustably engaging each said shaft.

References Cited in the file of this patent

UNITED STATES PATENTS

| Number | Name | Date |
|---|---|---|
| 151,644 | Wolfe | June 2, 1874 |
| 966,260 | Sprague | Aug. 2, 1910 |
| 1,221,915 | Schumaker | Apr. 10, 1917 |

FOREIGN PATENTS

| Number | Country | Date |
|---|---|---|
| 7,588 | Great Britain | of 1900 |
| 327,892 | Germany | Oct. 20, 1920 |